(12) United States Patent
Lindström et al.

(10) Patent No.: US 12,505,959 B2
(45) Date of Patent: Dec. 23, 2025

(54) SOLAR CELL COMPRISING A PLURALITY OF POROUS LAYERS AND CHARGE CONDUCTING MEDIUM PENETRATING THE POROUS LAYERS

(71) Applicant: Exeger Operations AB, Stockholm (SE)

(72) Inventors: Henrik Lindström, Danderyd (SE); Giovanni Fili, Danderyd (SE)

(73) Assignee: EXEGER OPERATIONS AB, Stockholm (SE)

( * ) Notice: Subject to any disclaimer, the term of this patent is extended or adjusted under 35 U.S.C. 154(b) by 362 days.

(21) Appl. No.: 18/277,759

(22) PCT Filed: Mar. 8, 2022

(86) PCT No.: PCT/EP2022/055892
§ 371 (c)(1),
(2) Date: Aug. 17, 2023

(87) PCT Pub. No.: WO2022/194618
PCT Pub. Date: Sep. 22, 2022

(65) Prior Publication Data
US 2024/0304397 A1    Sep. 12, 2024

(30) Foreign Application Priority Data

Mar. 18, 2021    (EP) ..................... 21163437

(51) Int. Cl.
*H01G 9/20* (2006.01)
*H01G 9/00* (2006.01)

(52) U.S. Cl.
CPC ......... *H01G 9/2022* (2013.01); *H01G 9/0029* (2013.01); *H01G 9/2013* (2013.01)

(58) Field of Classification Search
CPC .. H01G 9/2013; H01G 9/2022; H01G 9/2031; H01G 9/2095
See application file for complete search history.

(56) References Cited

U.S. PATENT DOCUMENTS

| 8,658,455 B2 | 2/2014 | Shin | |
|---|---|---|---|
| 2006/0289056 A1* | 12/2006 | Gondo | H01G 9/2031 136/263 |

(Continued)

FOREIGN PATENT DOCUMENTS

| EP | 0859386 A2 | 8/1998 |
|---|---|---|
| JP | 2017050442 A | 3/2017 |

(Continued)

OTHER PUBLICATIONS

International Search Report and Written Opinion from corresponding International Application No. PCT/EP2022/055892, mailed on Jun. 28, 2022, 12 pages.

(Continued)

*Primary Examiner* — Golam Mowla
(74) *Attorney, Agent, or Firm* — Tucker Ellis LLP

(57) ABSTRACT

The present invention relates to a solar cell (1*a*) comprising a stack of porous layers, a support substrate (2) for supporting the stack, and a charge conducting medium (7) penetrating through the porous layers. The stack comprises a porous light-absorbing layer (3), a porous first conductive layer (4) including conductive material for extracting photo-generated 5 electrons from the light-absorbing layer, a porous counter electrode (6) including conductive material, and a separating layer (5) made of porous electrically insulating material and arranged between the conductive layer (4) and the counter electrode (6), and where the conductive layer (4) is arranged closer to the light-absorbing layer (3) than the counter electrode (6). The support substrate (2) is porous, (Continued)

and the charge conducting medium (7) is penetrating through the support substrate (2).

15 Claims, 3 Drawing Sheets

(56) References Cited

U.S. PATENT DOCUMENTS

| | | | |
|---|---|---|---|
| 2009/0293950 A1 | 12/2009 | Chabrecek | |
| 2010/0132785 A1* | 6/2010 | Morooka | H01G 9/2077 |
| | | | 257/E31.127 |
| 2012/0103400 A1* | 5/2012 | Chiba | H01G 9/2081 |
| | | | 136/251 |
| 2015/0075592 A1 | 3/2015 | Lindström | |
| 2015/0083182 A1 | 3/2015 | Lindström | |
| 2020/0402726 A1* | 12/2020 | Lindström | H01G 9/2031 |
| 2021/0142956 A1* | 5/2021 | Lindström | H10F 19/90 |

FOREIGN PATENT DOCUMENTS

| | | |
|---|---|---|
| KR | 20120083999 A | 7/2012 |
| KR | 20120107253 A | 10/2012 |
| KR | 20140071492 A | 6/2014 |
| WO | 2013053501 A1 | 4/2013 |

OTHER PUBLICATIONS

Energy Trend of TrendForce Corp., "Keys to Flexible Solar cell's Mass Production: Cell Encapsulation and Durability," Published Jun. 14, 2018, 2 pages.
Korean Office Action from corresponding Korean Application No. 102023703453, issued on Sep. 25, 2023, 10 pages with translation.
Japanese Office Action from corresponding Application No. 2023-546089 mailed on Jan. 14, 2025, 5 pages with translation.

* cited by examiner

SOLAR CELL COMPRISING A PLURALITY OF POROUS LAYERS AND CHARGE CONDUCTING MEDIUM PENETRATING THE POROUS LAYERS

TECHNICAL FIELD

The present invention relates to solar cells for converting light energy into electrical energy comprising a plurality of porous layers and a charge conducting medium penetrating the porous layers.

BACKGROUND

Solar cells for converting light into electrical energy comprising a plurality of porous layers are well known in the art.

Dye-sensitized solar cells (DSSC) comprising a porous light absorbing layer, porous conductive layers and a porous isolation layer are known to have a high potential for industrial scale manufacturing using established manufacturing methods such as screen printing, inkjet printing, or slot die coating.

Industrial scale manufacturing of dye sensitized solar cells involves processing of large areas of the thin layers of the solar cell components. These components undergo various process steps, like printing, heat treatments, vacuum treatments, chemical treatments during manufacturing. This means that to handle the processing of the solar cell, the architecture of the solar cell is important in order to be able to handle the components mechanically and perform the various treatments without damaging underlying components. The architecture of the solar cell is also important for the overall performance of the solar cell.

A known procedure for manufacturing of dye sensitized solar cells is through a roll-to-roll process. In EnergyTrend 20180614 "Keys to Flexible Solar cell's Mass Production: Cell Encapsulation and Durability" the researchers describe that flexible DSSC produced by a roll-to-roll manufacturing process can be commercialized due to the efficiency of the production method.

In a roll-to-roll process, the solar cell comprises a solid substrate, like a flexible conductive foil, which can be placed on a conveyor belt and act as a mechanically stable substrate for positioning of other components of the solar cell. U.S. Pat. No. 8,658,455 describes a roll-to-roll process having a flexible substrate onto which a layer of $TiO_2$ is formed and the $TiO_2$ layer is sintered, provided with dye and loaded with electrolyte after which a second flexible substrate is added on top for sealing the sandwich type DSSC. The sealing step also involving the roll-to-roll process is said to improve the risk of leakage or evaporation of liquid electrolyte.

Flexible conductive foils are known, such as titanium, stainless steel or other metal foils or coated foils of conductive polymers or thin films of conductive glass.

A problem with the roll-to-roll manufacturing of dye sensitized solar cells concerns that some of the processes like heat treatments or vacuum treatments have to take place as the conveyor band rolls through the ovens or the chemical treatment boxes. This requires space and time for these processes.

Another way of manufacturing dye sensitized solar cell is described in EP2834823B1 in which a monolithic dye sensitized solar cell is shown in which all layers of components are porous. A porous insulating substrate made of woven and non-woven glass fibres acts as a support structure during the manufacturing and porous conductive metal layers are printed onto both sides of the porous insulating substrate. On one side the porous conductive layer the TiO2 layer is printed and on the other side the porous conductive layer is provided with a catalyst. The TiO2 layer is immersed with a dye and an electrolyte is added as the cells are cut into suitable pieces for lamination of the protective foil. During the process steps involving heat treatments, vacuum treatment or various chemical treatments, the workpiece in operation is entirely porous and several workpieces can be stapled on top of each other without hindering for example released gases to be vented out. The porous insulating substrate used as support substrate in the manufacturing will be the insulating layer between the working electrode and the counter electrode in the final solar cell. The thickness of the porous insulating substrate will therefore be a trade-off between making the insulating layer thin enough to reduce resistive losses in the solar cell and making the porous substrate thick enough to achieve sufficient mechanical properties for serving as a support structure. During the manufacturing, the support structure must be turned in order to print on both sides of the support.

EP1708301 discloses a dye sensitized solar cell with an architecture including a stack of porous layers arranged on top of each other, electrolyte integrally positioned in the pores of the porous layers and a support structure for supporting the stack of porous layers made of ceramic, metal, resin or glass.

Another problem with the dye-sensitized solar cells concerns evaporation or depletion of electrolytic solution or possible electrolytic leakage, especially during long-term usage of the solar cell.

SUMMARY

It is an aim of the present invention to at least partly overcome the above problem, and to provide an improved solar cell.

This aim is achieved by a solar cell as defined in claim 1.

The solar cell comprises a stack of porous layers arranged on top of each other, a charge conducting medium penetrating through the porous layers, and a support substrate for supporting the porous layers. The plurality of porous layers comprises a light-absorbing layer, a first conductive layer including conductive material for extracting photo-generated electrons from the light-absorbing layer, a counter electrode including conductive material, and a separating layer made of porous electrically insulating material and arranged between the first conductive layer and the counter electrode. The stack of porous layers is arranged on top of the support substrate, the support substrate is porous, and the charge conducting medium is penetrating through the porous support substrate.

The stack of porous layers are active layers, which means that they are involved in the power production. It is necessary that the charge conducting medium can penetrate through the stack of active porous layers to enable transport of charges between the light-absorbing layer and the counter electrode. The support substrate is not an active layer in the solar cell, i.e. it is not involved in the power production. The main function of the support substrate is to serve as a support for the stack of active layers.

The support substrate is porous and the charge conducting medium penetrates the pores of the substrate as well as the pores of the porous layers of the solar cell. Due to the porosity of the support substrate, the pores of the support substrate function as a reservoir of charge conducting medium. Thus, the total volume of charge conducting medium in the solar cell is increased. Consequentially, if the charge conducting medium in the solar cell is decreasing due to leakage or evaporation, the time until the total content of charge conducing medium in the solar cell has reach a minimum level and the solar cell stops working is prolonged. The thicker substrate and the higher porosity, the larger is the reservoir of charge conducting medium. Since the support substrate is not involved in the power generation, the thickness of the support substrate is not critical and does not affect the power generation.

Another advantage with the porous substrate is that it makes it easier to achieve an even filling of the charge conducting medium in the solar cell during manufacturing of the solar cell. This is a problem when thin and wide solar cells are manufactured. For instance, the area of the solar cell can be 1 m² and the thickness of the solar cell can be 0.2 mm. The charge conducting medium has to be infiltrated into the porous layers of the large solar cell, and preferably all of the pores in the porous layers of the solar cell are filled with the charge conducting medium. Due to the porous substrate in the bottom of the solar cell, the charge conducting medium can be introduced from a bottom side of the solar cell and by capillary forces fill most of the pores in the porous layers in the stack with the charge conducting medium.

Another advantage with the porous substrate is that vacuum filling of the cell with conducting medium, as in the prior art, is not needed. Vacuum filling is time consuming and requires extra equipment.

Another advantage with the porous substrate is that it retains the conducting medium by capillary forces and thereby prevents the conducting medium from pouring out. Therefore, in the case of breakage of the solar cell the conducting medium will be retained in the porous substrate and will not pour out.

Another advantage with having the porous layers stacked on a porous support substrate instead of a solid support substrate as in the prior art, is that it facilitates manufacturing of solar cells of large sizes since it allows gas to be emitted through the substrate during vacuum sintering of the solar cell and also during air sintering of the solar cell where combustion gases must be removed in later stages when layers comprising titanium dioxide, $TiO_2$, are air sintered and combustion gases from organic substances have to be removed by combustion. Thus, production of the solar cell is speeded up.

The solar cell is preferably a monolithic cell. A monolithic solar cell is characterized in that all the porous layers are directly or indirectly deposited on one and the same support substrate.

By having a porous support substrate at the bottom of the porous active layers, the manufacturing of the monolithic solar cell structure can profit from the beneficial procedure of stapling workpieces during the manufacturing process. Another advantage is that a support substrate at the bottom of the active layers and onto which the active layers are formed is that there is no need to turn the workpiece in operation during the manufacturing process.

Another advantage of the present invention is that the separating layer made of porous electrically insulating material is not defined by the support substrate. The porous separating layer between the porous electrically conductive layers can be formed by a cost-effective printing process and be made by a variety of materials. The thickness of the separating layer can be designed to optimize the efficiency of the solar cell.

According to an aspect, the solar cell comprises an encapsulation encapsulating the porous layers, the support substrate, and the conducting medium, and the porous layers are arranged on one side of the support substrate, and an opposite side of the support substrate is facing the encapsulation.

Each of the porous layers and the support substrate has pores. The charge conducting medium is penetrating through the pores of the porous layers and the support substrate. The charge conducting medium is integrally positioned in the pores of the porous layers and the pores of the support substrate.

According to an aspect, the average size of the pores of the plurality of porous layers is smaller than the average size of the pores of the support substrate so that the capillary forces in the pores of the porous layers are stronger than the capillary forces in the support substrate. Due to the fact that the pore sizes in the porous layers on top of the support substrate are smaller than the pore size in the support substrate, the capillary force of the porous layers will preferentially pump the charge conducting medium upwards where the capillary forces are stronger than the capillary forces in the support substrate. This action is analogous to a capillary pump action. This means in the presence of a leakage of charge conducting medium in the upper active layers, the charge conducting medium will preferentially be pumped from the reservoir upwards to the active layers, and the support substrate will act as a reservoir supplying charge conducting medium to the active layers.

The sizes of the pores in the substrate and the porous layers can, for example, be measured using a scanning electron microscope (SEM).

According to an aspect, at least 80% of the pores in the support substrate are larger than 3 μm, and at least 80% of the pores in the porous layers are smaller than 3 μm. Preferably, at least 90% of the pores in the support substrate are larger than 3 μm, and at least 90% of the pores in the porous layers are smaller than 3 μm. Preferably, at least 80% of the pores in the support substrate are between 3 μm and 10 μm, and most preferably at least 90% of the pores in the support substrate are between 3 μm and 10 μm. Thus, the pores in the porous layers are typically in the sub meter range, i.e. below 3 μm, and the pores in the support substrate are typically in the micrometre range, i.e. 3-10 am. The difference in pore size between the support substrate and the porous layers achieves that the capillary forces in the porous layers are stronger than the capillary forces in the support substrate, and consequentially the charge conducting medium will be pumped upwards to the active layers if the content of charge conducting medium in the active layers of the solar cell is reduced.

According to an aspect, the thickness of the support substrate is at least 20 μm, preferably at least 30 μm, and most preferably at least 50 μm. The thicker substrate, the larger is the reservoir of charge conducting medium.

According to an aspect, the thickness of the support substrate is between 20 μm and 200 μm.

According to an aspect, the porosity of the support substrate is at least 50%, and preferably at least 70%, and most preferably at least 80%. The higher porosity, the larger is the reservoir of charge conducting medium.

According to an aspect, the porosity of the support substrate is between 50% and 90%, and preferably between 70% and 90%.

According to an aspect, the support substrate comprises woven and/or non-woven microfibers. A microfiber is a fibre having a diameter less than 10 μm and larger than 1 nm.

According to an aspect, the support substrate comprises inorganic fibres.

According to an aspect, the support substrate comprises at least one of the following: glass fibres, ceramic fibres, and carbon fibres.

According to an aspect the microfibres have a diameter between 0.2 μm and 10 μm, preferably between 0.2 am and 5 μm, more preferably between 0.2 am and 3 μm, and most preferably between 0.2 and 1 μm.

According to an aspect, the support substrate comprises a layer of woven microfibers. Woven microfibers are flexible, and accordingly the solar cell becomes flexible.

According to an aspect, the support substrate comprises a layer of non-woven microfibers arranged on the layer of woven microfibers. Woven microfibers and non-woven microfibers are flexible, and accordingly the solar cell becomes flexible. The non-woven microfibers act as a spring cushion effectively absorbing and dampening incoming mechanical energy and also distributes incoming mechanical energy over a larger area thereby reducing the local effect. An advantage with having the porous layers stacked on a substrate comprising a layer of woven microfibers and non-woven is that the support substrate becomes chock absorbing and therefore more mechanically robust in cases where the solar cell is subjected to, e.g., mechanical bending or twisting or stretching or an impact hammer. This is an advantage when the solar cell is integrated into consumer products, such as headphones, remote controls, and cell phones.

According to an aspect the layer of non-woven microfibres is arranged closer to the counter electrode than the layer of woven microfibers. Preferably the layer of non-woven microfibers is contiguously arranged to the counter electrode.

According to another aspect the layer of woven microfibers is arranged closer to the counter electrode than the layer of non-woven microfibers. Preferably the layer of woven microfibers is contiguously arranged to the counter electrode.

According to an aspect the layer of woven microfibers comprises yarns with holes formed between them, and at least a part of the non-woven microfibers is accumulated in the holes between the yarns.

According to an aspect, the thickness of the separating layer is between 3 μm and 50 μm, and preferably between 4 μm and 20 μm. It is a desire to make the separating layer as thin as possible to reduce resistive losses in the solar cell and accordingly improve the efficiency of the solar cell. However, if the separating layer becomes too thin, there is a risk for short circuit between the conductive layer and the counter electrode.

According to an aspect, the separating layer comprises porous electrically insulating material. Preferably the electrically insulating material is made of electrically insulating particles. Such a separating layer can be manufactured be applying several layers of insulating particles on top of each other to achieve a desired thickness of the separating layer. Thus, it is possible to control the thickness of the separating layer and the thickness of the separating layer can be chosen depending on the need.

According to an aspect said electrically insulating particles consists of an insulating material.

According to an aspect said electrically insulating particles comprises a core of semi-conducting material and an outer layer of an electrically insulating material covering the core.

According to an aspect, the insulating material of the outer layer of the insulating particles comprises one or more of the materials in the group consisting of alumina ($Al_2O_3$), zirconium oxide ($ZrO_2$), silicon oxide ($SiO_2$), and aluminosilicate. The aluminosilicate is, for example, $Al_2SiO_5$.

According to an aspect, the insulating material of the outer layer of the insulating particles is one or more of the materials in the group consisting of alumina ($Al_2O_3$), zirconium oxide ($ZrO_2$), silicon oxide ($SiO_2$), and aluminosilicate. The aluminosilicate is, for example, $Al_2SiO_5$.

According to an aspect the semiconducting material in the core of the insulating particle comprises titanium dioxide ($TiO_2$).

According to an aspect the semiconducting material in the core of the insulating particle is titanium dioxide ($TiO_2$).

According to an aspect the electrically insulating material of the insulating particles comprises one or more of the materials in the group consisting of alumina ($Al_2O_3$), zirconium oxide ($ZrO_2$), silicon oxide ($SiO_2$), and aluminosilicate. The aluminosilicate is, for example, $Al_2SiO_5$. According to a further aspect the insulating material may be glass.

According to an aspect the electrically insulating material of the insulating particles is one or more of the materials in the group consisting of alumina ($Al_2O_3$), zirconium oxide ($ZrO_2$), silicon oxide ($SiO_2$), and aluminosilicate. The aluminosilicate is, for example, $Al_2SiO_5$. According to a further aspect the insulating material may be glass.

According to an aspect, the charge conducting medium is a liquid electrolyte.

Certain conducting media, like copper complex electrolytes and cobalt complex electrolytes, can have very low electrical conductivity resulting in very large electrical resistive losses. The low electrical conductivity originates from the fact that the electrolytes have large ions with low diffusion rate. When a liquid electrolyte transport charges, the charges move with Brownian motion, i.e. they move randomly due to collisions with fast-moving atoms or molecules in the liquid. Copper and cobalt have relatively large ions that are slow moving and thus have low conductivity. The efficiency of using such electrolytes is greatly improved by having a short distance between the counter electrode and the light absorbing layer. The present invention makes it possible to choose the thickness of the separating layer and accordingly select a suitable distance between the counter electrode and the light absorbing layer depending on the electrolyte.

According to an aspect, the conducting medium comprises copper complexes. An advantage with using copper complexes for charge transportation is that the conducting medium will be non-toxic. The use of copper as conducting medium has been shown to give a very high resulting photo voltage. The solar cell according to the invention allows the use of copper complexes due to the fact that the distance between the counter electrode and the light absorbing layer can be made short.

According to a further aspect the charge conducting medium comprises iodide ($I^-$) and triiodide ($I_3^-$).

Another object of the present invention is to provide a method for producing the solar cell: The method comprises:
  providing a porous support substrate,
  depositing a porous counter electrode on the porous support substrate,
  depositing a porous separating layer on the counter electrode,
  depositing a porous conductive layer on the separating layer, depositing a porous light-absorbing layer on the conductive layer,
introducing a charge conducting medium into the stack and the support substrate until the charge conducting medium is penetrating the support substrate and the stack,
sealing the solar cell.

According to an aspect depositing the porous counter electrode comprises depositing a porous second conductive layer and a porous catalytic layer on top of the second conductive layer.

According to an aspect the charge conducting medium is introduced on the side of the support substrate that is facing way from the stack such that the support substrate and the stack is impregnated with the charge conducting medium.

The depositing of the porous counter electrode, the porous separating layer, the porous first conductive layer and the porous light absorbing layer are, for example, done by a spraying or printing technique, such as ink jet printing or screen printing.

BRIEF DESCRIPTION OF THE DRAWINGS

The invention will now be explained more closely by the description of different embodiments of the invention and with reference to the appended figures.

DETAILED DESCRIPTION

Figure 1:
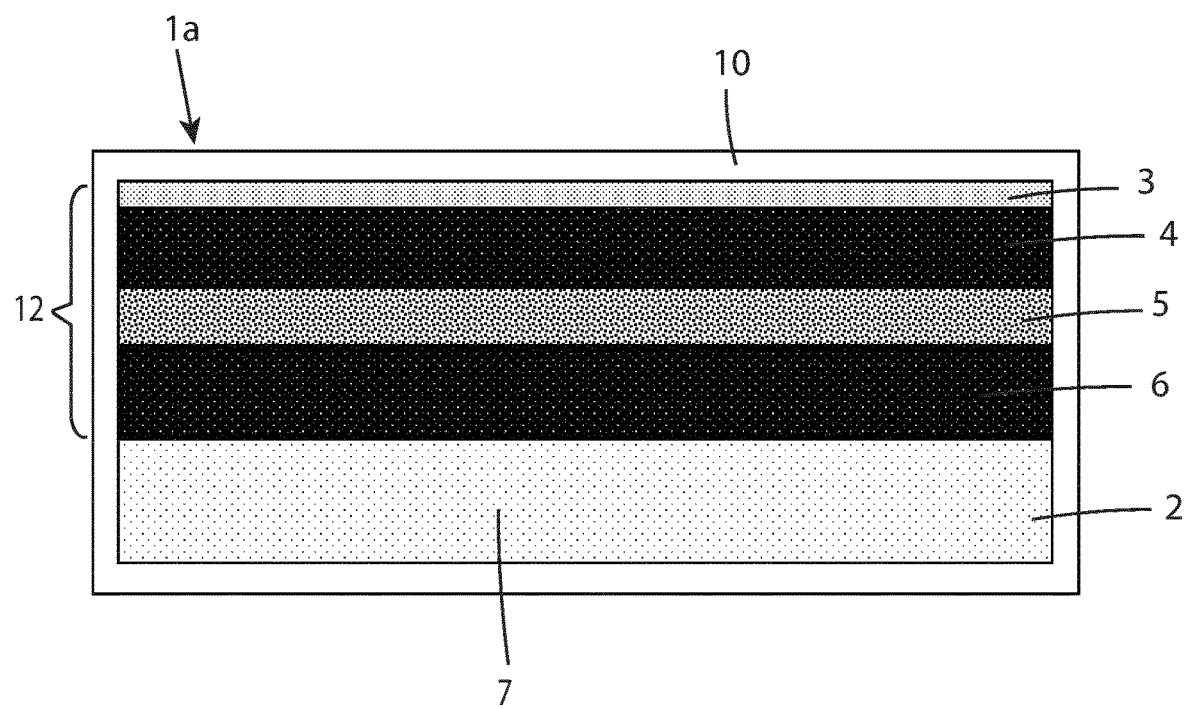
FIG. 1 shows a cross-section through an example of a solar cell according to the invention.

Aspects of the present disclosure will be described more fully hereinafter with reference to the accompanying drawings. The solar cell device can, however, be realized in many different forms and should not be construed as being limited to the aspects set forth herein. Like numbers in the drawings refer to like elements throughout.

FIG. 1 shows a cross-section through an example of a solar cell 1a according to the invention. The solar cell 1a comprises a support substrate 2 and a stack 12 of porous layers 3-6 arranged on top of the support substrate 2. The stack 12 of porous layers comprise a light-absorbing layer 3, which serves as a working electrode, a conductive layer 4 made of porous conducting material, which serve as a current collector, a separating layer 5 comprising porous electrically insulating material, and a counter electrode 6 comprising porous conducting material. The counter electrode 6 is formed on one side of the porous substrate 2. In this example, the counter electrode is a porous conductive layer. The separating layer 5 is arranged between the counter electrode 6 and the conductive layer 4. The separating layer 5 serves the function of separating the conductive layer 4 and the counter electrode 6 physically and electrically to avoid direct electronic short circuit between them. In this example, the separating layer 5 is formed on the counter electrode 6 and the conductive layer 4 is formed on the separating layer 5. The light-absorbing layer 3 is arranged on top of the conductive layer 4. The first conductive layer 4 includes conductive material for extracting photo-generated electrons from the light-absorbing layer 3. The light absorbing layer 3 can be made in different ways. For example, the light absorbing layer may comprise dye molecules adsorbed on surfaces of semiconducting particles, or clusters of dye, or grains made of a semiconducting material, such as silicon.

The porous layers 3-6 are active layers, which means that they are involved in the power production. The support substrate 2 is not an active layer in the solar cell, i.e. it is not involved in the power production. The support substrate 2 supports the stack 12 of porous layers 3-6. Further, the support substrate 2 allows the counter electrode 6 to be printed on it during manufacturing of the solar cell. The porous layers 3-6 are arranged on one side of the support substrate 2.

Each of the porous layers formed on the support substrate has a large number of pores. The solar cell further comprises a charge conducting medium 7 penetrating the pores of porous layers 3-6 to enable transport of charges between the light-absorbing layer 3 and the counter electrode 6. The support substrate 2 is also porous and include pores. The charge conducting medium 7 penetrates the pores of the support substrate 2 as well as the pores of the porous layers 3-6 of the solar cell. Due to the porosity of the support substrate 2, the pores of the support substrate function as a reservoir of charge conducting medium.

In one aspect, the average size of the pores of the porous layers 3-6 in the stack 12 is smaller than the average size of the pores of the support substrate 2 so that the capillary forces in the pores of the porous layers 3-6 are stronger than the capillary forces in the support substrate 2. The difference in pore size between the support substrate 2 and the porous layers 3-6 makes the capillary forces in the porous layers stronger than the capillary forces in the support substrate 2, and consequentially the charge conducting medium 7 will be pumped upwards to the active layers 3-6, if the content of charge conducting medium in the active layers of the solar cell is reduced.

Preferably, at least 80% of the pores in the support substrate 2 are larger than 3 μm, and at least 80% of the pores in the porous layers are smaller than 3 μm. More preferably, at least 90% of the pores in the support substrate 2 are larger than 3 μm, and at least 90% of the pores in the porous layers 3-6 are smaller than 3 μm. For example, at least 80% of the pores in the support substrate 2 are between 3 μm and 10 μm.

The thicker support substrate 2, the larger is the reservoir of charge conducting medium in the solar cell. Typically, the thickness of the support substrate 2 is between 20 μm and 200 μm. Preferably, the thickness of the support substrate is at least 30 μm.

The higher porosity in the support substrate, the larger reservoir of charge conducting medium 7. Preferably, the porosity of the support substrate is at least 50%, and most preferably at least 70%. If the support substrate is too porous the mechanical strength of the substrate will be too low. Preferably, the porosity of the support substrate is between 50% and 90%.

The solar cell further comprises an encapsulation 10 encapsulating the porous layers 3-6, the support substrate 2, and the conducting medium 7. The stack 12 of porous layers is arranged on one side of the support substrate 2, and an opposite side of the support substrate is facing the encapsulation 10.

The stack 12 of porous layers may include other porous layers arranged between the porous layers 3-6. For example, there can be a porous catalytic layer disposed between the support substrate 2 and the counter electrode 6, or between the counter electrode 6 and the separating layer 5, as shown in FIG. 1b. Further, there can be a porous reflective layer arranged between the conductive layer 4 and the light-absorbing layer 3. The same conditions as mentioned above regarding the pore size applies for all layers in the stack 12 of porous layers independent om the number of layers.

Figure 2:
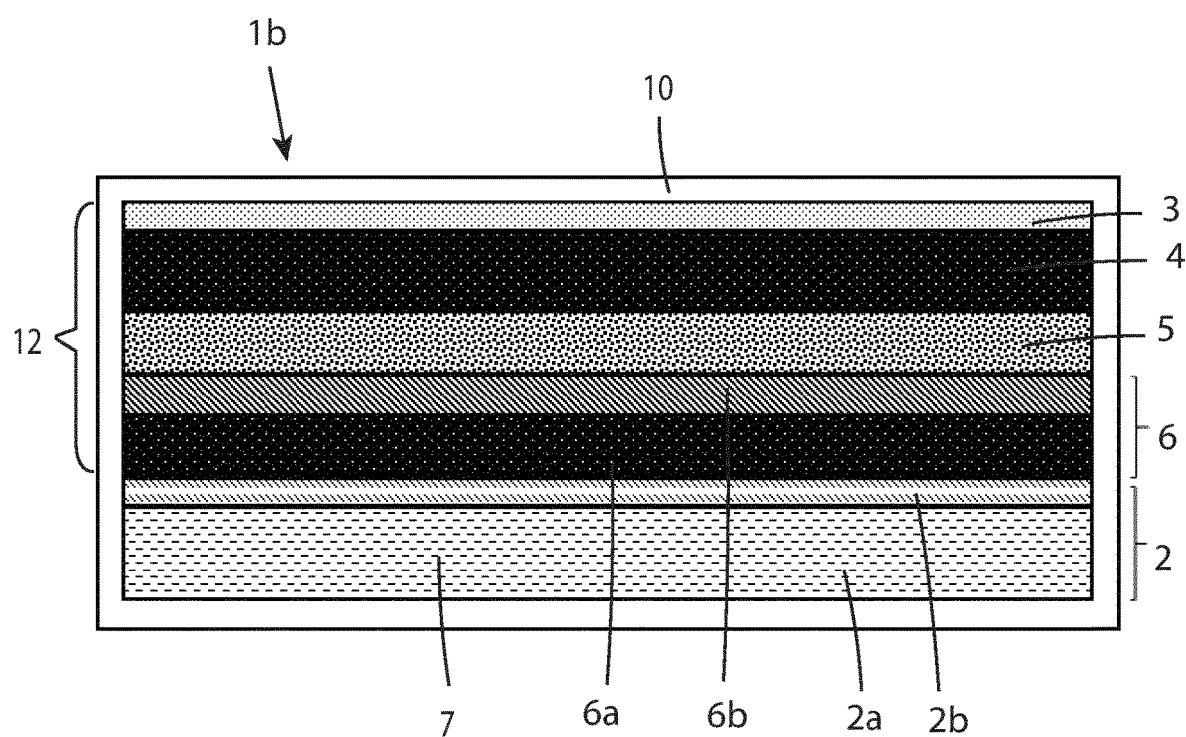
FIG. 2 shows a cross-section through another example of a solar cell according to the invention.

FIG. 2 shows a cross-section through another example of a solar cell 1b according to the invention. The solar cell 1b comprises a support substrate 2 and a stack 12 of porous layers 3-6 arranged on top of the support substrate 2. The solar cell 1b differs from the solar cell 1a in that the counter electrode 6 of the solar cell 1b comprises a second porous conductive layer 6a and a porous catalytic layer 6b formed on top of the porous conductive layer 6a.

In this example, the support substrate 2 comprises a layer of woven microfibers 2a and a layer of non-woven microfibers 2b arranged on the layer of woven microfibers 2a. The counter electrode 6 is disposed on the layer of non-woven microfibers 2b. In this example, the porous conductive layer 6a of the counter electrode 6 is formed on the layer of non-woven microfibers 2b. Alternatively, the catalytic layer 6b is disposed on the layer of non-woven microfibers 2b. The layer 2a of woven microfibers comprises yarns with holes formed between them, and at least a part of the non-woven microfibers is accumulated in the holes between the yarns. Preferably, the microfibers in the layer 6b of non-woven microfibers have a diameter between 0.2 µm and 5 µm, to achieve pores having a size above 1 µm. EP2834824B1 discloses methods for manufacturing a substrate 2 comprising woven as well as non-woven microfibers.

The solar cells 1a and 1b are of monolithic type. This means that all the porous layers are directly or indirectly deposited on the same support substrate 2. The solar cells 1a and 1b can, for example, be dye sensitized solar cells (DSC).

Figure 3:
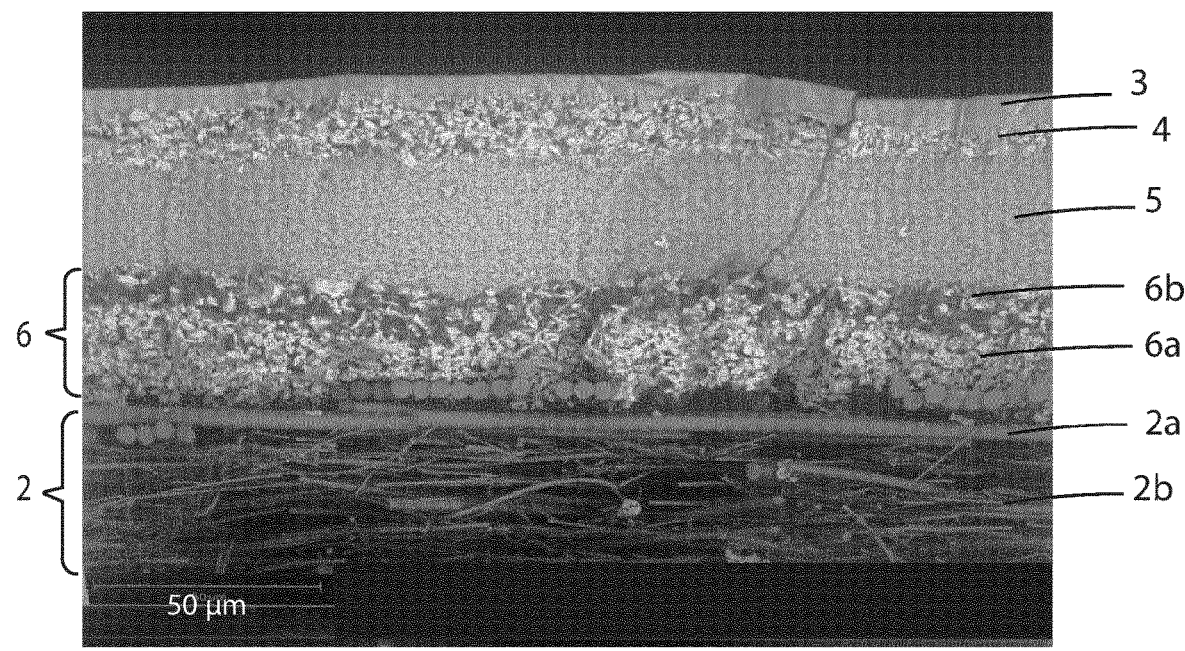
FIG. 3 shows an SEM image of a cross section through an example of an embodiment of the invention.

FIG. 3 shows an SEM image of a cross section through an example of an embodiment of the invention showing the support substrate 2 comprising the layer of woven microfibers 2a on top of the layer of non-woven microfibers 2b. On support substrate 2 the second porous conductive layer 6a is arranged, thereafter the catalytic layer 6b, and on top of the catalytic layer the separating layer 5. On top of the separating layer 5 the first conductive layer 4 is arranged and thereon the light absorbing layer 3.

Figure 4:
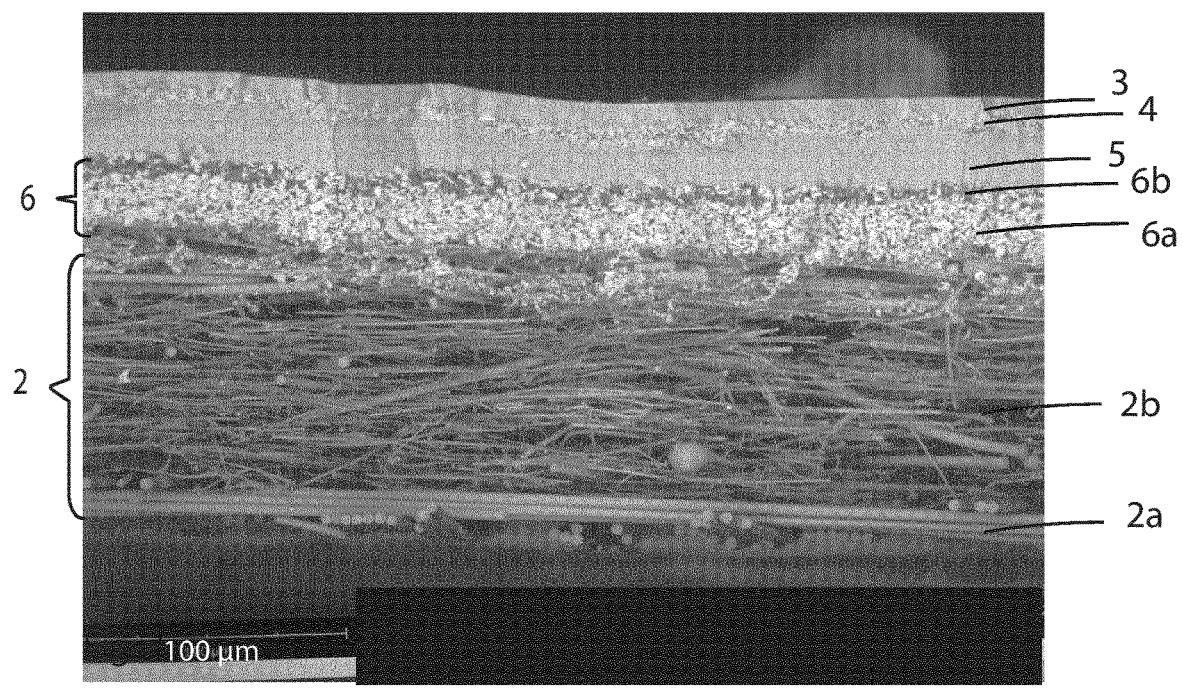
FIG. 4 shows an SEM image of a cross section through another example of an embodiment of the invention.

FIG. 4 shows an SEM image of a cross section through another example of an embodiment of the invention showing a support substrate 2 comprising a layer of non-woven microfibers 2b on top of a layer of woven microfibers 2a. On support substrate 2 the second porous conductive layer 6a is arranged, thereafter the catalytic layer 6b, and on top of the catalytic layer the separating layer 5. On top of the separating layer 5 the first conductive layer 4 is arranged and thereon the light absorbing layer 3.

Preferably, the pore size of the light-absorbing layer 3 is equal or smaller than the pore size of the first conductive layer 4, the pore size of the first conductive layer 4 is equal or smaller than the pore size of the separating layer 5, and the pore size of the separating layer 5 is equal or smaller than the pore size of the layers of the counter electrode 6, 6a, 6b. The pore size of counter electrode 6, 6a, 6b is preferably smaller than the pore size of the support substrate 2, 2a,2b.

In one embodiment of the invention, the pore size in the stack 12 of porous layers decrease from the counter electrode 6 to the light absorbing layer 3. For example, the pore size of the light-absorbing layer 3 is smaller than the pore size of the first conductive layer 4, the pore size of the first conductive layer 4 is smaller than the pore size of the separating layer 5, and the pore size of the separating layer 5 is smaller than the pore size of the counter electrode 6, 6a, 6b. The pore size of the counter electrode 6, 6a, 6b is smaller than the pore size of the support substrate 2, 2a,2b. This embodiment will strengthen the difference in capillary forces in the porous layers compared to the capillary forces in the support substrate 2.

The light absorbing layer 3 is facing the incident light. The light absorbing layer 3 can be made in different ways. For example, the light absorbing layer 3 may comprise a porous $TiO_2$ layer deposited onto the first conducting layer 4. The $TiO_2$ layer may comprise $TiO_2$ particles having dye molecules absorbed on their surfaces. In another example, the light absorbing layer 3 comprise a plurality of grains of a doped semiconducting material, such as silicon, deposited on the conducting layer 4. The charge conducting medium is integrally positioned in pores formed between the grains. The thickness of the light absorbing layer 3 can vary and depends on the type of the light absorbing layer 3.

The top side of the solar cell 1a;1b should be facing the light to allow the light to hit the light-absorbing layer 3. According to some aspects, the light absorbing layer is a porous $TiO_2$ nanoparticle layer with adsorbed organic dye or organometallic dye molecules or natural dye molecules. However, the light-absorbing layer 3 may also comprise grains of a doped semiconducting material, for example, Si, CdTe, CIGS, CIS, GaAs, or perovskite.

The conductive layer 4 serves as a back contact that extracts photo-generated charges from the light absorbing layer 3. The porosity of the conductive layer 4 can preferably be between 30% and 85%. Depending on which material is used for the conductive layer 4 and which manufacturing method is used, the thickness of the conductive layer 4 can vary between 1 µm and 50 µm. For example, the conductive layer 4 is made of a material selected from a group consisting of titanium, titanium alloys, nickel alloys, graphite, and amorphous carbon, or mixtures thereof. Most preferably, the conductive layer is made of titanium or a titanium alloy or mixtures thereof. In such case, the thickness of the conductive layer 4 is preferably between 4 m and 30 m.

The separating layer 5 serve as an electrical separating between the conductive layer 4 and the counter electrode 6 to avoid short circuit between them. The distance between the counter electrode 2 and the light absorbing layer 3 depends on the thickness of the separating layer 5 and should be as small as possible so that the transport of charges between the counter electrode 2 and the light absorbing layer 3 becomes as fast as possible and consequentially to reduce resistive losses in the solar cell. The thickness of the separating layer is, for example, between 3 µm and 50 µm, and preferably between 4 am and 20 µm. The separating layer comprises porous electrically insulating material. For example, the separating layer comprises a porous layer of electrically insulating particles. For example, the insulating particles have a core of a semiconducting material and an outer layer of electrical insulating material. For example, a layer of insulating oxide is formed on the surfaces of the semiconducting material. Suitably, the semiconducting material is titanium dioxide ($TiO_2$). The insulating material is, for example, alumina or silicon oxide. Alternatively, the entire particles may be of insulating material, for example, alumina ($Al_2O_3$), silicon oxide ($SiO_2$), or zirconium oxide ($ZrO_2$).

The counter electrode 6 comprises a porous conducting layer 6a. The counter electrode normally also comprises a catalytic layer 6b. The counter electrode 6 can have a separate porous catalytic layer 6b or have catalytic particles integrated in the porous conducting layer 6a. The porosity of the counter electrode 6 can preferably be between 30% and 85%. Depending on which material is used for the counter electrode 6 and the manufacturing method, the thickness of the counter electrode 6 can vary between 1 am and 50 μm. For example, the counter electrode 6 is made of a material selected from a group consisting of titanium, titanium alloys, nickel alloys, graphite, and amorphous carbon, or mixtures thereof. Most preferably, the counter electrode 6 is made of titanium or a titanium alloy or mixtures thereof. In such case, the sickness of the conductive layer 4 preferably is between 10 μm and 30 μm. To achieve a catalytic effect, the counter electrode 6 may include platinized particles of conductive metal oxides, such as platinized ITO, ATO, PTO, and FTO, or particles of platinized carbon black or graphite.

The support substrate 2, can be a microfiber-based substrate, such as glass microfiber substrate or ceramic microfiber substrate. The support substrate 2 is suitable made of microfibers. A microfiber is a fibre having a diameter less than 10 μm and length larger than 1 nm. Suitably, the support substrate 2 comprises woven microfibers. The microfibers can be made of a refractory and inert material, such as glass, $SiO_2$, $Al_2O_3$ and aluminosilicate. Organic microfibers are fibres made of organic materials such as polymers such as, e.g., polycaprolactone, PET, PEO etc, or cellulose such as, e.g., nanocellulose (MFC) or wood pulp. The support substrate 2 may comprise woven microfibers and non-woven microfibers disposed on the woven microfibers. Suitably, the support substrate 2 comprises fiberglass. For example, the porous support substrate can be made of woven and non-woven glass fibers. The thickness of the support substrate 2 is suitably between 10 μm and 1 mm. Such a layer provides the required mechanical strength.

The charge conducting medium 7 is integrally positioned in the in pores of the porous layers 3-6 and the pores of the support substrate 2 and transfers charges between the counter electrode 6 and the light absorbing layer 3. The conducting medium 7 can be any suitable conducting medium, such as a liquid, a gel, or a solid material such as a semiconductor. Examples of electrolytes are liquid electrolytes, such as those based on iodide($I^-$)/triiodide($I_3^-$)-ions or cobalt complexes as redox couple, or gel electrolytes, ordinary polymer electrolytes. Preferably, the conducting medium is a liquid electrolyte, such as an ionic liquid-based electrolyte, a copper-complex based electrolyte, or a cobalt-complex based electrolyte.

The solar cells must be properly sealed to avoid leakage of the charge conducting medium. For example, the solar cell is provided with the encapsulation 10 enclosing the solar cell unit. However, the encapsulation must be penetrated in some way to enable access to the power produced by the solar cell. Although, the penetrations are sealed, there is a risk for a slow leakage of the charge conducting medium from the solar cell. Leakage may also occur from the sealed edges of the encapsulation. The slow leakage of charge conducting medium will cause a slow deterioration of the efficiency of the solar cell. When the content of charge conducing medium in the solar cell has reached a minimum level, the light to electricity converting ability of the solar cell will decrease. This process can take several months or even years depending on the quality of the encapsulation and the sealing.

The encapsulation 10 acts as barriers in order to protect the solar cell against the surrounding atmosphere, and to prevent the evaporation or leakage of the charge conducting medium from inside the cell. The encapsulation 10 may include an upper sheet covering a top side of the solar cell and a lower sheet covering a bottom side of the solar cell. The upper sheet on the top side of the solar cell covers the light absorbing layer and needs to be transparent, allowing light to pass through. A bottom side of the support substrate 2 is facing the lower sheet of the encapsulation 10. The light-absorbing layer 3 is facing the upper sheet of the encapsulation 10. The upper and lower sheets are, for example, made of a polymer material. The edges of the upper and lower sheets are sealed.

According to one aspect the encapsulation 10 of the solar cell 1a;1b comprises a plurality of penetration openings (not shown in figures) to enable access to the power produced by the solar cell. The penetration openings receive wires to electrically connect to the first conductive layer 4 and the counter electrode 6. The penetration openings may be arranged in connection to the first conductive layer 4 and the counter electrode 6. Preferably the penetration openings are arranged in the side of the encapsulation arranged below the support substrate 7.

Figure 5:
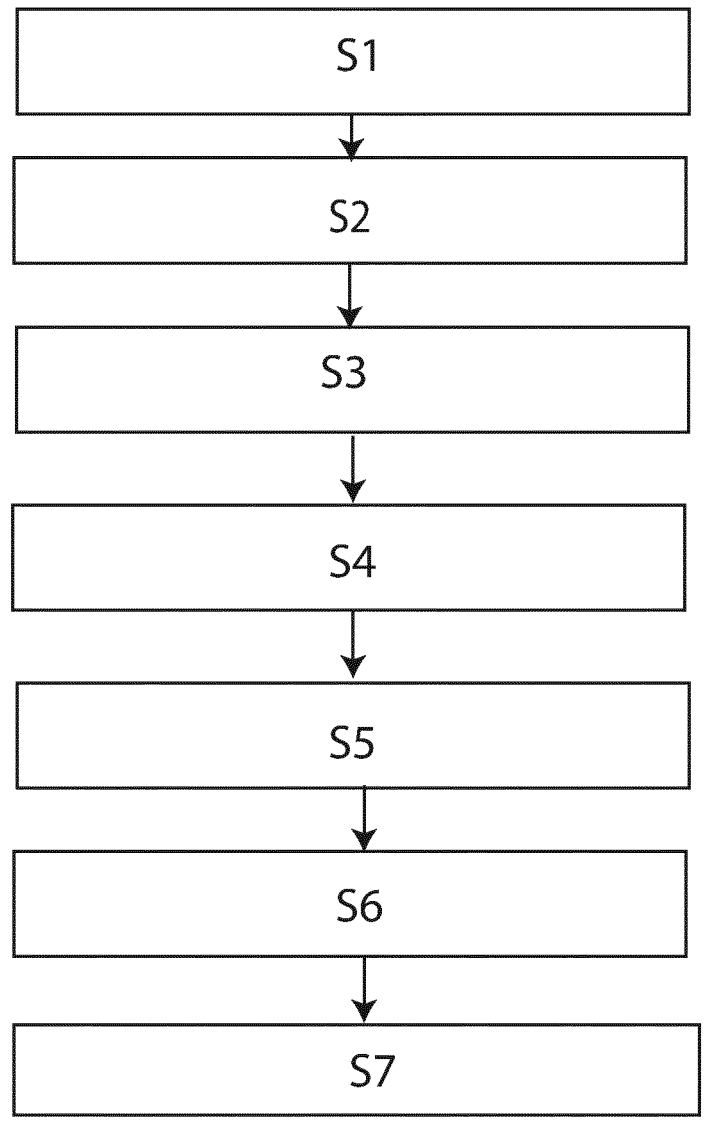
FIG. 5 shows a block diagram of an example of a method of manufacturing the solar cell according to the invention.

FIG. 5 shows a block diagram of an example of a method of manufacturing the solar cell according to the invention. The method in FIG. 5 comprises the following steps:

S1: providing a porous support substrate 2,
S2: depositing a porous counter electrode 6 on the porous support substrate 2,
S3: depositing a porous separating layer 5 on the counter electrode 6,
S4: depositing a first porous conductive layer 4 on the separating layer 5,
S5: depositing a porous light-absorbing layer 3 on the first conductive layer 4,
S6: introducing a charge conducting medium 7 into the stack 12 and the support substrate 2 until the charge conducting medium 7 is penetrating the support substrate 2 and the stack 12,
S7: sealing the solar cell.

According to one aspect the charge conducting medium 7 is introduced on the side of the support substrate that is facing way from the stack 12 such that the support substrate and the stack is impregnated with the charge conducting medium.

The depositing in steps S2-S5 is, for example, done by a spraying or printing technique, such as ink jet printing or screen printing.

An example of how the step S3 can be carried out will now be explained in more details. A separator ink is prepared by mixing a powder of insulating particles with a solvent, a dispersing agent, and a binder. The solvent is, for example, water or an organic solvent. The binder is, for example, hydroxy propyl cellulose. The dispersing agent is, for example, Byk 180. The mixture is stirred until aggregated particles in the powder are separated into single particles, and the particles in the ink is well dispersed. The separator ink is deposited on the counter electrode 6 by a spraying or printing technique. The depositing of the separator ink can be repeated two, three, or more times until a sufficiently thick layer of insulating particles has be deposited on the counter electrode. Preferably, the layer of separator ink is dried before the next layer of separator ink is deposited on the previous layer of separator ink. It is advantageous to repeat the depositing of the separator ink two or more times since the following layers of ink will repair possible defects in the previous layers of insulating particles. Is it important that there are no defects, such as, cracks or holes, in the separating layer 5 since this will lead to short circuit between the counter electrode 6 and the porous first conductive layer 4.

The solar cell 1a in FIG. 1 is infiltrated with a charge conducting medium 7 in the pores of the light absorbing layer 3, in the pores of the first conductive layer 4, in the pores of the separating layer 5, in the pores of the counter electrode 6 and in the pores of the support substrate 2. The charge conducting medium forms a continuous layer inside the pores of the conducting layers, and between the conducting layers inside the pores of the separating layer thereby enabling transport of electrical charge between the counter electrode 6 and the working electrode including the first conductive layer 4 and the light absorbing layer 3. The first porous conductive layer 4 extracts the electrons from the light absorbing layer 3 and transports the electrons to an external electrical circuit connected to the counter electrode 6 (not shown in FIG. 1). The counter electrode 6 is used to transfer the electrons to the charge conducting medium 7. The conducting medium 7 transfers electrons back to the light absorbing layer 3 thereby completing the electrical circuit.

Depending on the nature of the charge conducting medium 7, either ions or electrons and holes can be transported between the counter electrode and the working electrode.

Electrolytes in dye-sensitized solar cells are normally classified as liquid electrolytes, quasi-solid-state electrolytes, or solid-state electrolytes. The electrolytes can be in the form of a liquid, gel or in solid state. There are a large number of electrolytes of either type known in literature, see for example Chemicals Reviews, Jan. 28, 2015, "Electrolytes in Dye-Sensitized Solar Cells". The electrolytes are an expensive component of the Dye-Sensitized Solar Cells. The counter electrode is normally equipped with a catalytic substance 6b that serves the purpose of facilitating the transfer of electrons to the electrolyte.

The charge conducting medium exhibits a certain electrical resistance to transport charges. The electrical resistance increases with the charge transport distance. Therefore, when electrical charge is transported between the counter electrode and the light absorbing layer, there will always be a certain electrical resistive loss in the conducting medium. By making the porous substrate thinner, the resistive losses can be reduced. However, when the porous substrate becomes thinner it also becomes more mechanically fragile.

The conducting medium is, for example, a conventional $I^-/I_3^-$ electrolyte or a similar electrolyte, or a Cu-/Co- complex electrolyte. Solid state transition metal-based complexes or organic polymer hole conductors are known conducting mediums.

According to some aspects, the conducting medium comprises copper ions complexes. A conducting medium having copper complexes as charge conductor is a non-toxic conducting medium. The use of copper complexes as conducting medium has been shown to give a very high resulting photo voltage.

The counter electrode 6 can, for example, be deposited on the support substrate 2 by printing with an ink including solid conductive particles. The conductive particles, such as metal hydride particles, can be mixed with a liquid to form an ink suitable for the printing process. The conductive particles may also be milled or otherwise treated to achieve a suitable particle size, and accordingly a desired pore size of the porous counter electrode 6. The solid particles are preferably metal based and can be pure metals, metal alloys or metal hydrides or hydrides of metal alloys or mixtures thereof.

The conductive layer 4 can be deposited on the separating layer 5 in the same way as the counter electrode 6 is deposited on the support substrate 2. The deposits can be treated by a heat treatment step. During the heat treatment a sintering of the particles also shall take place, thereby increasing the conductivity and the mechanical stability of the conducting layers. Metal hydrides will transform to metal during the heat treatment. By heating in vacuum or inert gas contamination of the particles is prevented, and electrical contact between the particles is improved.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

The terms photovoltaic cell and solar cell are synonymously.

Unless otherwise defined, all terms used herein have the same meaning as commonly understood by one of ordinary skill in the art to which this disclosure belongs.

The present invention is not limited to the embodiments disclosed but may be varied and modified within the scope of the following claims. For example, the stack of porous layers can contain other porous layers, and the order of the porous layers in the stack can be changed.

The invention claimed is:

1. A solar cell comprising a stack of porous layers, a support substrate for supporting the stack, and a charge conducting medium penetrating through the stack, wherein the stack comprises:
    a porous light-absorbing layer,
    a porous first conductive layer including conductive material for extracting photo-generated electrons from the light-absorbing layer,
    a porous counter electrode including conductive material, and
    a separating layer made of porous electrically insulating material and arranged between the first conductive layer and the counter electrode, and where the first conductive layer is arranged closer to the light-absorbing layer than the counter electrode,
    wherein the stack of porous layers is arranged on top of the support substrate, the support substrate is porous, and the charge conducting medium is penetrating through the support substrate.

2. The solar cell according to claim 1, wherein the charge conducting medium is integrally positioned in pores of the porous layers and pores of the support substrate, and the average size of the pores of the porous layers is smaller than the average size of the pores of the support substrate so that the capillary forces in the pores of the porous layers are stronger than the capillary forces in the pores of the support substrate.

3. The solar cell according to claim 1, any of claim 1, wherein the size of at least 80% of the pores in the porous layers is smaller than 3 µm.

4. The solar cell according to claim 1, wherein the size of at least 80% of the pores in the support substrate is larger than 3 µm.

5. The solar cell according to claim 1, wherein the porosity of the support substrate is at least 50%, and preferably at least 70%, and most preferably at least 80%.

6. The solar cell according to claim 1, wherein the thickness of the support substrate is at least 20 µm, preferably at least 30 µm, and most preferably at least 50 µm.

7. The solar cell according to claim 1, wherein the support substrate comprises microfibres.

8. The solar cell according to claim 7, wherein the support substrate comprises microfibers having a diameter between 0.2 µm and 10 µm, preferably between 0.2 µm and 5 µm, and most preferably between 0.2 and 1 µm.

9. The solar cell according to claim 1, wherein the support substrate comprises woven and non-woven microfibers.

10. The solar cell according to claim 9, wherein the support substrate comprises a layer of woven microfibers and a layer of non-woven microfibers arranged on the layer of woven microfibers.

11. The solar cell according to claim 1, wherein the support substrate is flexible.

12. The solar cell according to claim 1, wherein the thickness of the separating layer is between 3 µm and 50 µm, and preferably between 15 and 35 µm, and most preferably between 4 µm and 20 µm.

13. The solar cell according to claim 1, wherein the charge conducting medium is a liquid electrolyte.

14. A method for manufacturing the solar cell according to claim 1, wherein the method comprises:

providing a porous support substrate, depositing a porous counter electrode on the porous support substrate-, depositing a porous separating layer on the counter electrode, depositing a porous first conductive layer on the separating layer, depositing a porous light-absorbing layer on the conductive layer, introducing a charge conducting medium into the stack and the support substrate until the charge conducting medium is penetrating the support substrate and the stack, sealing the solar cell.

15. The method according to claim 14, wherein depositing the porous counter electrode comprises depositing a porous second conductive layer and a porous catalytic layer on top of the second conductive layer.

\* \* \* \* \*